United States Patent [19]

Rempe

[11] Patent Number: 5,226,359
[45] Date of Patent: Jul. 13, 1993

[54] BALE SIZE INDICATOR

[75] Inventor: Scott A. Rempe, Pella, Iowa

[73] Assignee: Vermeer Manufacturing Company, Pella, Iowa

[21] Appl. No.: 848,923

[22] Filed: Mar. 10, 1992

[51] Int. Cl.$^5$ .................. B65B 13/18; A01D 39/00
[52] U.S. Cl. ............................... 100/88; 100/99; 56/341; 53/507
[58] Field of Search ................. 100/4, 5, 88, 99; 56/341; 116/299, 303, 313; 53/507, 587, 116

[56] References Cited

U.S. PATENT DOCUMENTS

| 4,167,844 | 9/1979 | Freimuth et al. | 100/5 |
| 4,517,295 | 5/1985 | Meiers | 100/99 |
| 4,750,323 | 6/1988 | Sheehan et al. | 56/341 |
| 4,855,924 | 8/1989 | Strosser et al. | 100/5 |

FOREIGN PATENT DOCUMENTS

| 0060956 | 9/1982 | European Pat. Off. | 56/341 |
| 2647630 | 12/1990 | France | 56/341 |

Primary Examiner—Philip R. Coe
Assistant Examiner—Reginald L. Alexander
Attorney, Agent, or Firm—Kent A. Herink; Brian J. Laurenzo

[57] ABSTRACT

An adjustable bale size indicator for a baler which forms cylindrical bales comprising a first indicator member mounted for pivotal movement on the baler and having a bale diameter indicia exposed forwardly of the baler. The first indicator member is attached to the belt tension mechanism and moves pivotally in response to increasing bale diameter. A second indicator member having a shield indicator is adjustably attached to the first indicator member the pointer indicating the maximum bale size position on the bale diameter indicia. A full bale switch mounts adjacent to the second indicator member. The second indicator member contains a flag to change the state of the switch when the bale size reaches a bale diameter equal to that set on the bale diameter indicia by the shield indicator. The change in state of the full bale switch generates a signal to the operator indicating the bale has reached the desired diameter.

9 Claims, 4 Drawing Sheets

BALE SIZE INDICATOR

BACKGROUND OF THE INVENTION

The invention relates generally to bale size indicators for balers of large round bales and, more specifically, to a bale size indicator that is quickly and easily adjustable to indicate a "near full" and a "full bale" condition over a wide range of bale diameters.

Baling machines such as those described in U.S. Pat. Nos. 3,722,197 and 4,172,354 have revolutionized the baling industry. These balers form large cylindrical bales of crop material. A plurality of endless belts transversely spaced across the width of the baler form a baling chamber. Crop material is picked up by a crop pick up mechanism which feeds the crop material into the baling chamber. The endless belts roll and compress the crop material to form the bale. A belt tension mechanism keeps tension on the endless belts during the bale forming operation. Bales may be formed that are up to six feet or more in diameter.

Baler operators often desire to tailor bale diameter to a variety of handling capacities and storage requirements. Previously, bale diameter was regulated by monitoring a mechanical pointer attached to the belt tension mechanism as it moved along a stationary scale with bale diameter demarcations. The baler operator watched the pointer and stopped baling when the desired bale diameter was reached. Later, electrical near-full and full bale magnetic reed switches were added to indicate bale diameter. These switches were mounted on the baler frame and tripped by switch flags pivotally moved by the belt tension mechanism. As the bale reached near-full and full size, the flags changed the state of the switch and sent a signal to the operator in the form of lights and buzzers. The critical bale diameter was regulated by adjusting the location of the flags on the belt tension mechanism.

The present invention is a bale size indicator with both mechanical and electric indicating means. The mechanical system includes a stationary pointer and a moving scale positioned on an indicator member that attaches to the belt tension mechanism. The indicator member contains switch flags which change the state of bale size indicator switches. Having the switch flags on the indicator members rather than the belt tension mechanism allows the operator to select quickly and easily a wide range of "full bale" diameters on the indicator member which thereby automatically adjusts the flags to trip the switches at the adjusted diameters.

SUMMARY

The invention consists of a bale size indicator for a baler that forms large cylindrical bales. The bale size indicator comprises a pair of indicator members pivotally mounted on the baler frame. A first indicator member is connected to the baler's belt tension mechanism and has bale diameter indicia which indicate bale size to the operator. A second indicator member is attached for adjustable pivotal movement relative to the first indicator member and has radial ears that change the state of magnetic reed switches which generate a signal to the baler operator indicating the size of the bale.

An object of the invention is to provide a bale size indicator having both mechanical and electrical means to signal the operator of bale forming progress.

Another object of the invention is to provide a bale size indicator which may be easily adjusted in the field for proper operation.

A further object of the invention is to provide a bale size indicator that is compact and self-contained allowing it to mount easily on the baler in an appropriate location.

Other objects and advantages of the invention will be apparent from the following description of the invention.

DETAILED DESCRIPTION OF THE PREFERRED EMBODIMENT

Figure 1:
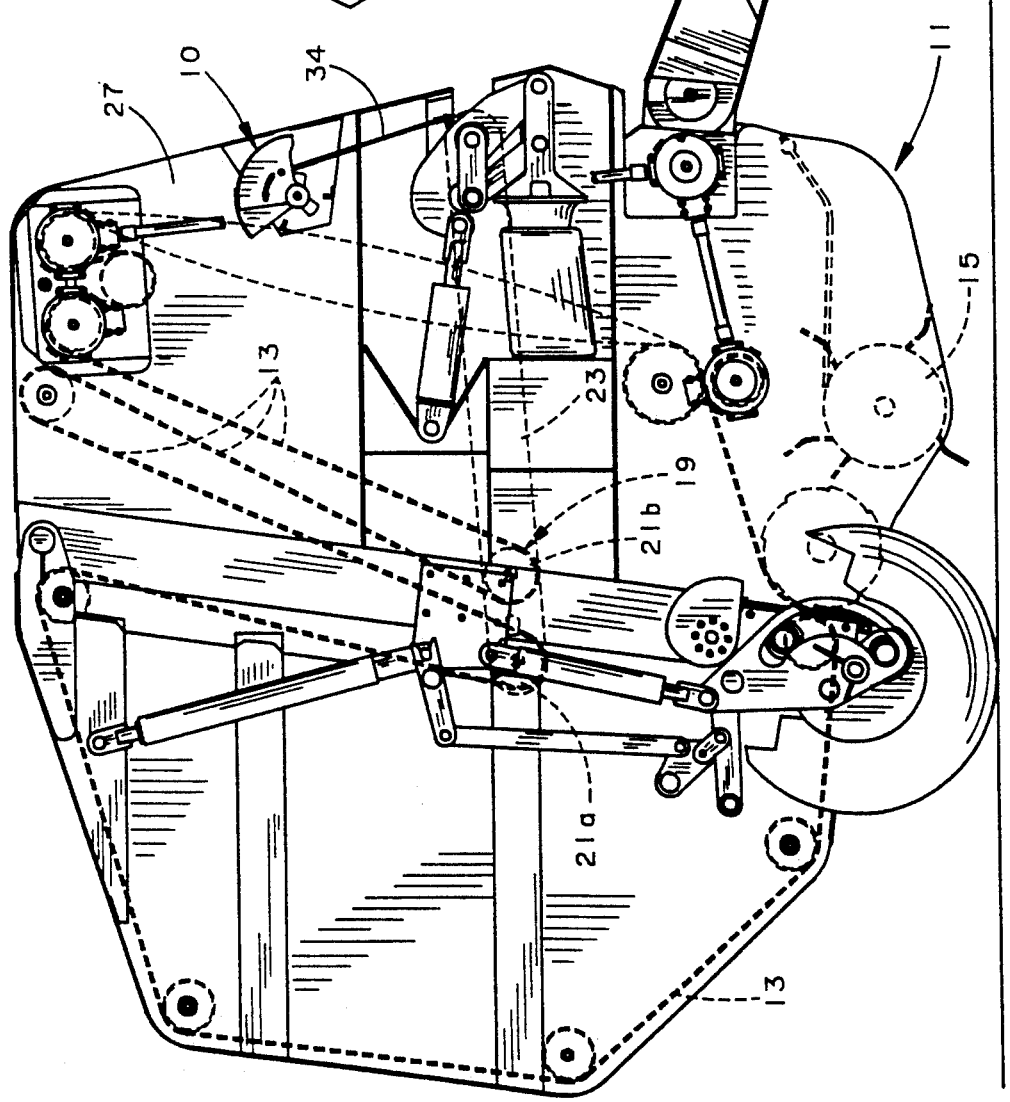
FIG. 1 is a side elevational view in cross-section of a baler in which the present invention has been installed.
Figure 5A:
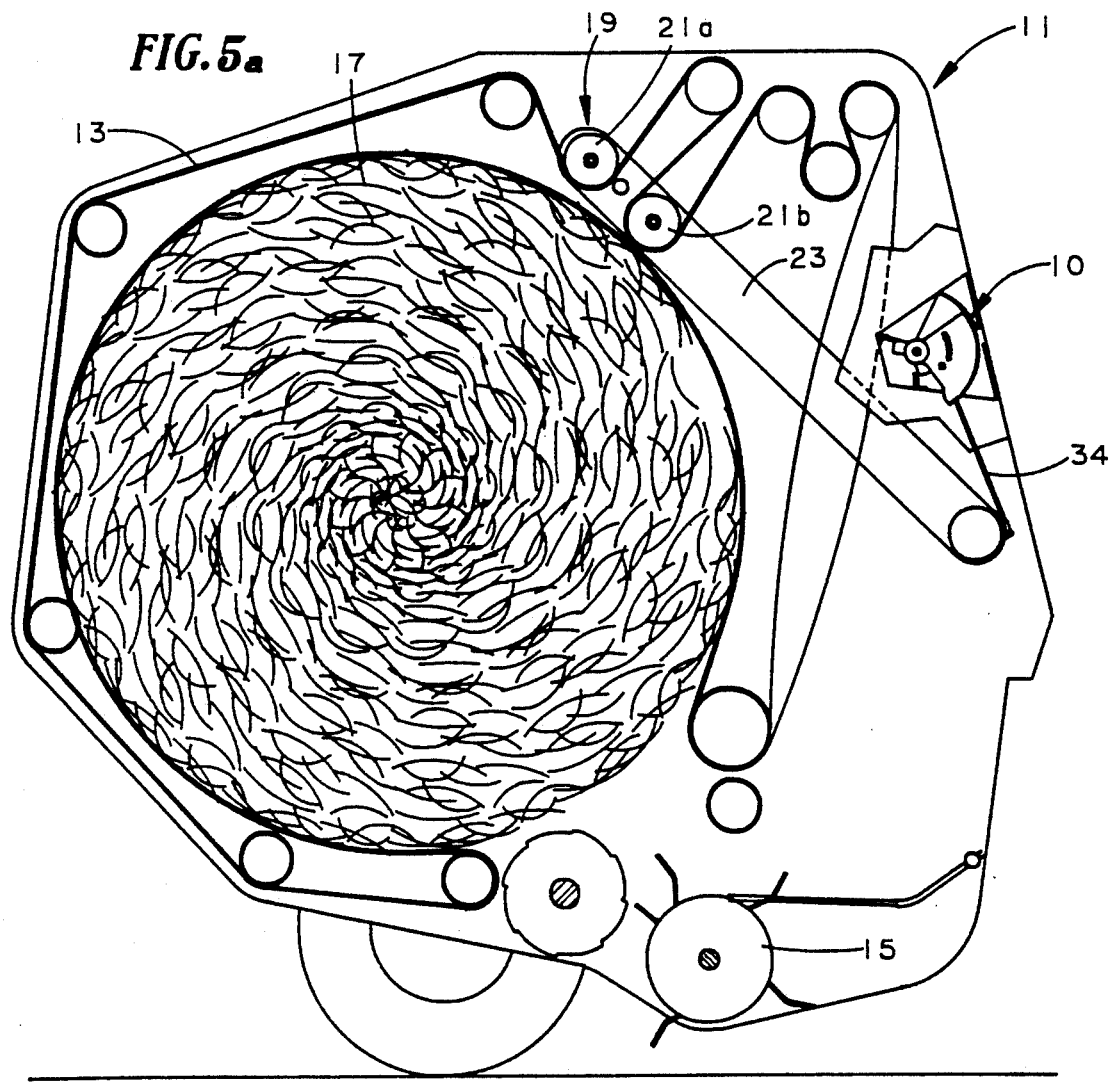
FIG. 5a is a side cross sectional view of a baler with a fully formed bale in the baling chamber.
Figure 6A:
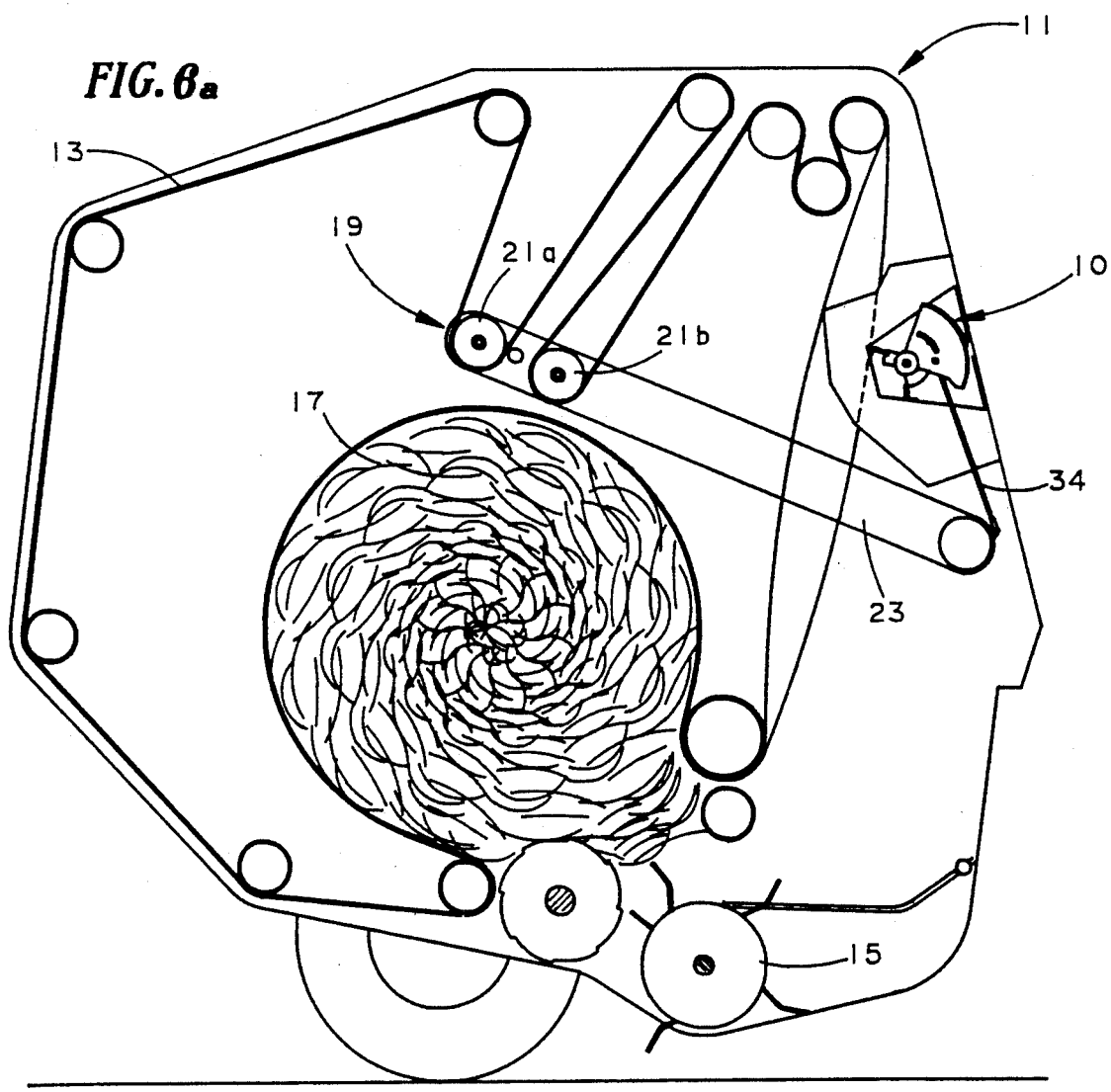
FIG. 6a is a side view of a baler with a three foot diameter bale in the baling chamber.
Figure 6B:
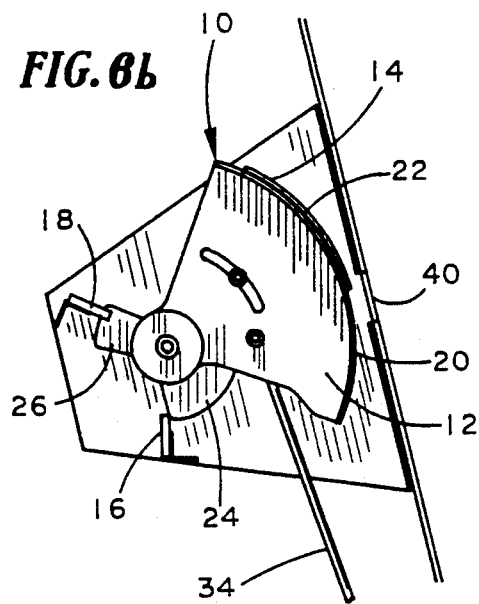
FIG. 6b is a side elevational view of the position of the second indicator member relative to the first indicator member when the bale size indicator is set to form a three foot diameter bale.

Illustrated in FIG. 1, generally at 11, is a baler of large cylindrical bales of crop material shown in the empty condition prior to the introduction of crop material. The baler 11 is drawn over the ground by a tractor (not shown) on which is situated an operator. A plurality of endless belts 13 are spaced transversely across the width of the baler 11 to form a baling chamber. A crop pick-up mechanism 15 lifts crop material and conveys it upwardly and rearwardly toward the baling chamber. The endless belts 13 roll and compress the crop material to form a bale 17 (FIGS. 5a and 6a). A belt tension and take-up mechanism, indicated generally at 19, includes a pair of idler rollers 21a and 21b carried on a belt tension arm 23 and about which the belts 13 are trained (FIG. 1). As the bale 17 inside the baling chamber expands in diameter, the belt tension arm 23 will pivot in the clockwise direction, as illustrated in FIGS. 5a and 6a. Accordingly, the pivotal position of the belt tension arm 23 is indicative of the size of the bale 17 that is being formed in the baler 11.

Figure 2:
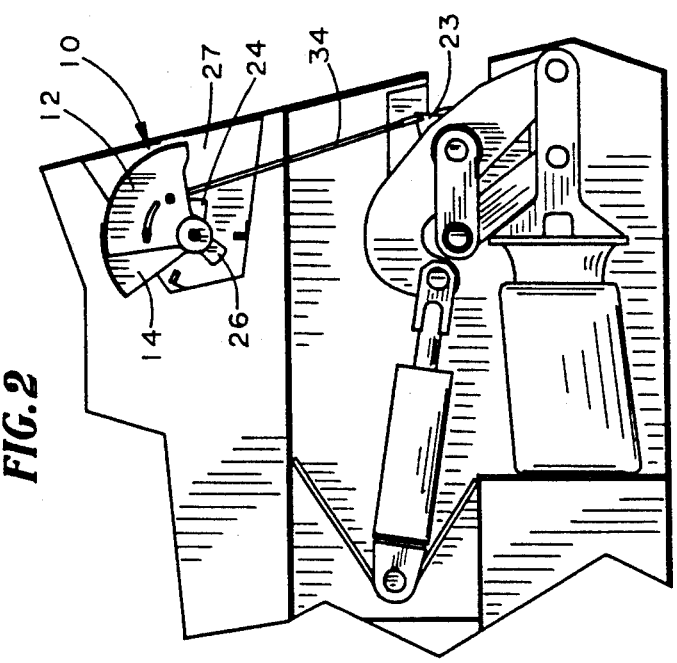
FIG. 2 is a detail side elevational view of the present invention.
Figure 3:
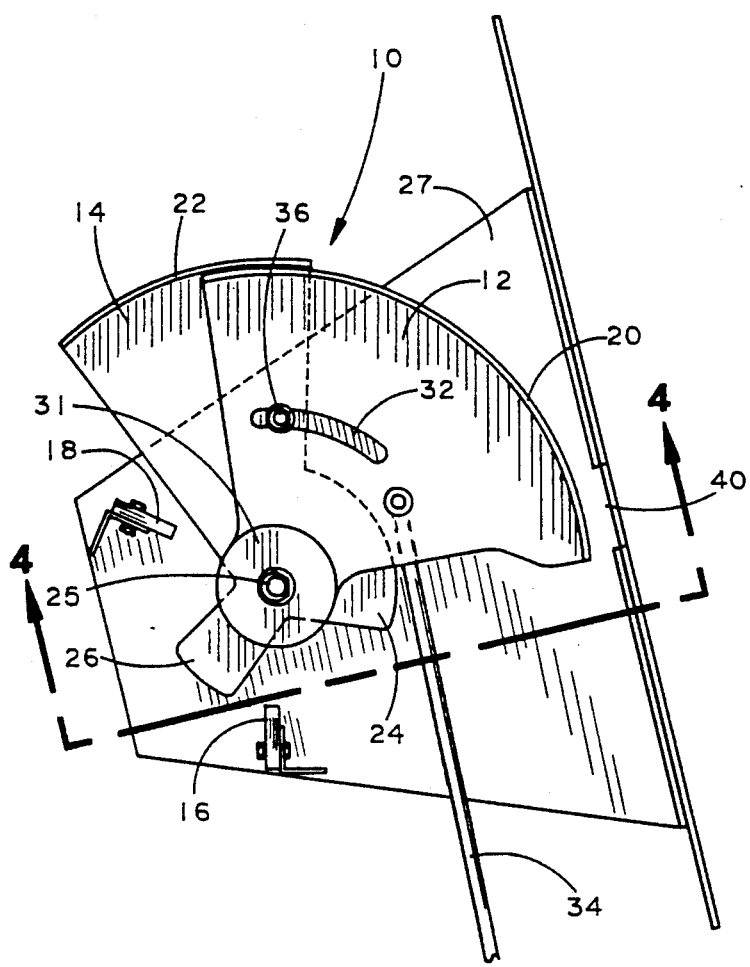
FIG. 3 is an enlarged detail side view of the bale size indicator.
Figure 4:
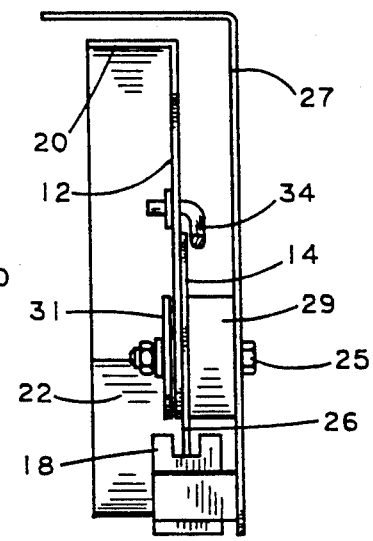
FIG. 4 is a view taken along 4—4 of FIG. 3.
Figure 6C:
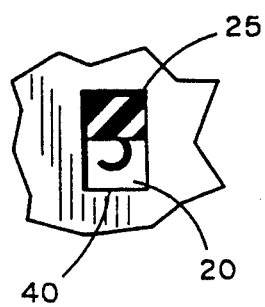
FIG. 6c is a front view of the baler shield window through which is seen the bale diameter indicia indicating a three foot bale diameter.

FIGS. 1-3 illustrate, generally at 10, a bale size indicator that is interconnected to and is pivoted along with belt tension arm 23. The bale size indicator 10 includes a first indicator member 12, a second indicator member 14 and two magnetic reed switches 16, 18. The first indicator member 12 is approximately a one-quarter section of a circular plate with an overturned arc-shaped peripheral portion 20 that displays bale diameter indicia. The second indicator member 14 is a fin-shaped plate with an overturned arc-shaped peripheral shield 22 having a striped decal 25 (FIG. 6c). The second indicator member 14 includes two radially extended ears 24, 26 positioned opposite the arc-shaped shield 22 (FIG. 2). The radial ears 24, 26 serve as ferrous flags to change the state of the two magnetic reed switches 16, 18.

The indicator members 12, 14 are mounted on a nut and bolt 25 for pivotal movement adjacent a side wall portion 27 of the baler 11. A spacer washer 29 holds the second indicator member 14 away from the side wall portion 27 and a flat washer 31 is positioned between the first indicator member 12 and the nut of the nut and bolt 25.

A bolt of a bolt and nut combination 36 is received in an aperture in the second indicator member 14 and passes through an arcuate slot 32 of the first indicator member 12. When the nut is loosened, the second indicator member 14 can be adjustably pivoted relative to the first indicator member 12 and then tightened to releasably secure the second indicator member 14 in the selected adjusted position. A pull rod 34 interconnects the first indicator member 12 to the belt tension arm 23 so that the first and second indicator member 12, 14 are pivoted along with pivotal movement of the belt tension arm 23. Shielding covers the bale size indicator 10 to protect it from the environment of the baler 11. A portion of the bale size indicia on the peripheral portion 20 of the first indicator member 12 is exposed forwardly of the baler 11 through a window 40 (FIG. 5c) until the bale size indicator 10 is pivoted sufficiently so that the striped decal 25 of the overlying peripheral shield 22 is exposed (FIG. 6c).

In use, the operator adjusts the second indicator member 14 relative to the first indicator member 12 to control bale size diameter. The bale diameter indicia on the peripheral portion 20 is a scale numbered from "0" to "6" representing no bale in the baling chamber, "0," to a bale six feet in diameter in the baling chamber, "6." As the bale begins to form, the belt tension mechanism adjusts to accommodate the growing bale. The adjusting belt tension and take-up mechanism 19 pulls downwardly on the pull bar 34 which in turn pivots the indicator members 12, 14. The amount of pivotal movement of the indicator members 12, 14 corresponds to the bale size which is indicated by the bale diameter indicia on the peripheral portion 20 of the first indicator member 12. Because the bale diameter indicia is exposed forwardly of the baler through the window 40, a baler operator can visually monitor the bale diameter.

Figure 7:
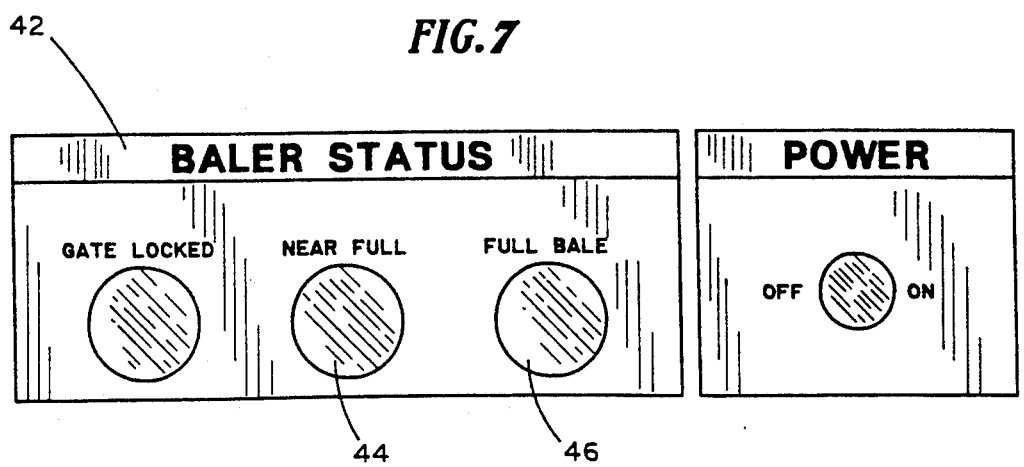
FIG. 7 is a front view of the baler control panel at the operator's station.

The amount of pivotal movement of the indicator members 12, 14 also provide the mechanism for the electronic bale size indicating means. The radial ears 24, 26 on the second indicator member 14 serve as flags to alter the state of full bale and near-full bale magnetic reed switches, 16 and 18 respectively. As the bale grows larger in diameter, the second indicator member 15 pivots until the radial ear 26 comes into contact with the near-full magnetic reed switch 18. The change in state of the switch 18 is detected by a monitor 42 which illuminates the near full light 44 on the monitor control panel at the operator's station (FIG. 7). The indicator members 12, 14 continue to pivot with the belt tension arm 23 until the bale 17 reaches the selected maximum size whereupon the radial ear 24 comes in contact with the full bale switch 16. This change of state is also detected by the monitor 42 which generates a signal to illuminate the full-bale light 46 on the baler control panel at the operator's station.

The near-full magnetic reed switch 18 is positioned so that the radial flag 26 will change its state when the bale diameter has come within about six to twelve inches of the selected maximum diameter. The full bale magnetic reed switch 16 is correspondingly positioned so that it is tripped by the radial flag 24 when the selected maximum diameter is reached (which is also visually represented by exposure of the appropriate bale diameter indicia numeral through the window 40). To form a bale of any selected diameter within the range of the baler 11, the nut and bolt combination 36 is loosened and the second indicator member 14 is pivoted such that the peripheral shield 22 overlies that portion of the bale size indicia on the peripheral portion 20 of the first indicator member 12 above or greater than the numeral of the selected diameter.

Figure 5B:
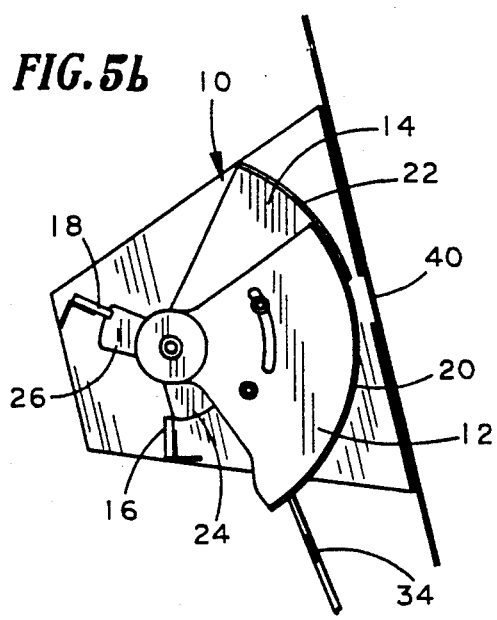
FIG. 5b is a side elevational view showing the position of the second indicator member relative to the first indicator member when the bale size indicator is set to form full sized bales.
Figure 5C:
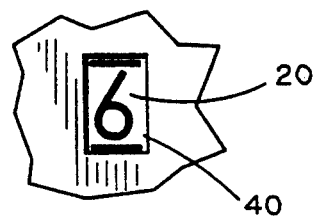
FIG. 5c is a front view of the baler shield window through which is seen the bale diameter indicia indicating a six foot bale diameter.

For example, to form a bale of six feet in diameter the second indicator member 14 is positioned above the numeral "6" on the bale size indicia scale (FIGS. 5a–c). When the bale reaches approximately five to five and one-half feet in diameter, the flag 26 will trip the near-full switch 18 and the near-full light 44 will be illuminated to alert the operator that the bale is nearly complete. At approximately six feet in diameter, the full bale switch 16 will be tripped by the flag 24 (FIG. 5b), the numeral "6" will be exposed (FIG. 5c) and the full bale light 46 will be illuminated.

If the baler operator needs a bale that is only, say, two and one-half feet in diameter, the operator adjusts the second indicator member 14 so that the arc-shaped peripheral shield 22 and striped decal halfway overlays the bale diameter indicia 20 at the three foot mark (see FIG. 6c). The diagonally striped decal indicates to the operator mechanically when the bale reaches two and one-half feet in diameter as illustrated by the view of the baler window in FIG. 5c. By adjusting the relative position of the indicator members 12, 14 the radial ears 24, 26 are in closer proximity to the full-bale and near-full magnetic reed switches 16, 18 respectively (FIG. 5b). The switches change state when the bale is near two feet and at two and one-half feet in diameter and a signal is generated to illuminate the appropriate lights on the bale control panel 42 at the operator's station (FIG. 7).

While the present invention has been described as both mechanically and electrically indicating a selected maximum bale diameter, the invention includes a bale size indicator which would be hidden from view and provide information on the bale diameter only through electrically actuated signal means, such as lights or buzzers.

Although the invention has been described with respect to a preferred embodiment thereof, it is to be understood that it is not to be so limited since changes and modifications can be made therein which are within the full intended scope of this invention as defined by the appended claims.

I claim:

1. An adjustable bale size indicator for a baler in which is formed cylindrical bales, the adjustable bale size indicator comprising:
    (a) a first indicator member mounted for pivotal movement on the baler and having bale diameter indicia exposed forwardly of the baler;

(b) means for pivotally moving said first indicator in response to increasing bale diameter;

(c) a second indicator member adjustably attached for pivotal movement with said first indicator member and visual indicating means of said second indicator adjustable therewith to a desired maximum bale size position on said bale diameter indicia;

(d) a full bale switch mounted adjacent said second indicator member;

(e) means on said second indicator member for changing the state of said full bale switch upon growth of a bale in the baler to a diameter substantially equal to that set on the bale diameter indicia by said visual indicating means; and (f) signal means operable by said full bale switch.

2. An adjustable bale size indicator as defined in claim 1, wherein the baler has a belt tension arm which pivots upon formation of a bale in the baler and said means for pivotally moving said first indicator member is a rod interconnecting said first indicator member to said belt tension arm.

3. An adjustable bale size indicator as defined in claim 1, wherein said first indicator member has an arc-shaped peripheral portion which displays said bale diameter indicia.

4. An adjustable bale size indicator as defined in claim 3, wherein said visual indicator means is an arc-shaped shield that overlies the portion of said bale diameter indicia greater than said desired maximum bale diameter.

5. An adjustable bale size indicator as defined in claim 1, further comprising:

(a) a near-full bale switch mounted adjacent to said second indicator member;

(b) second means on said second indicator member for changing the state of said near-full bale switch upon growth of a bale in the baler to a preselected diameter less than said maximum diameter; and (c) near-full bale signal means operable in response to said near-full bale switch.

6. An adjustable bale size indicator as defined in claim 1, wherein said means for changing the state of said switch is a radially extended ear.

7. An adjustable bale size indicator as defined in claim 5, wherein said means for changing the state of said near-full bale switch is a radially extended ear.

8. An adjustable bale size indicator for a baler in which is formed cylindrical bales, comprising:

(a) first and second indicator members mounted for pivotal movement on the baler about a common axis;

(b) means for pivoting said indicator members in response to increasing diameter of a bale being formed in the baler;

(c) bale diameter indicia on said first indicator member exposed forwardly of the baler;

(d) visual indicating means on said second indicator means;

(e) means for adjusting the pivotal position of said second indicator member relative to said first indicator member to position said visual indicating means adjacent said bale diameter indicia at a desired maximum bale diameter;

(f) a full bale switch mounted adjacent said second indicator member;

(g) means on said second indicator member for changing the state of said switch when the diameter of the forming bale is substantially equal to the desired maximum bale diameter; and (h) signal means operable by said switch.

9. An adjustable bale size indicator for a baler in which is formed cylindrical bales, the adjustable bale size indicator comprising:

(a) a bale diameter scale which indicates the diameter of the bale forming in the baler is mounted for pivotal movement on the baler;

(b) means adjustably secured to said scale for indicating on said scale a desired maximum bale diameter;

(c) means for pivotally moving said scale in response to growth of a bale in the baler;

(d) signal means; and (e) means for operating said signal means upon growth of a bale in the baler substantially equal to that set on said scale by said indicating means.

* * * * *